US011265889B2

(12) United States Patent
Geraci et al.

(10) Patent No.: US 11,265,889 B2
(45) Date of Patent: Mar. 1, 2022

(54) SCHEDULING USER EQUIPMENT IN THE UNLICENSED BAND

(71) Applicant: Nokia Technologies Oy, Espoo (FI)

(72) Inventors: Giovanni Geraci, Dublin (IE); Lorenzo Galati Giordano, Dublin (IE); Adrian Garcia Rodriguez, Dublin (IE); David Lopez Perez, Dublin (IE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/465,053

(22) PCT Filed: Nov. 16, 2017

(86) PCT No.: PCT/EP2017/079508
§ 371 (c)(1),
(2) Date: May 29, 2019

(87) PCT Pub. No.: WO2018/099732
PCT Pub. Date: Jun. 7, 2018

(65) Prior Publication Data
US 2019/0387534 A1    Dec. 19, 2019

(30) Foreign Application Priority Data
Dec. 2, 2016   (EP) .................................... 16201985

(51) Int. Cl.
*H04W 72/12*      (2009.01)
*H04B 17/318*     (2015.01)
(Continued)

(52) U.S. Cl.
CPC ...... *H04W 72/1226* (2013.01); *H04B 7/0452* (2013.01); *H04B 17/318* (2015.01); *H04W 16/14* (2013.01); *H04W 72/046* (2013.01)

(58) Field of Classification Search
CPC ............ H04W 72/1226; H04W 16/14; H04W 72/046; H04B 17/318; H04B 7/0452
See application file for complete search history.

(56) References Cited

U.S. PATENT DOCUMENTS

2011/0039547 A1    2/2011  Van Rensburg et al.
2018/0324004 A1*  11/2018  Shikida ............ H04W 72/1231

OTHER PUBLICATIONS

Adhikary Ansuman et al., "Massive MIMO and inter-tier interference coordination," 2014 Information Theory and Applications Workshop, IEEE XP032590203, pp. 1-10, 2014.
(Continued)

*Primary Examiner* — Peter P Chau
(74) *Attorney, Agent, or Firm* — Fay Sharpe, LLP

(57) ABSTRACT

A method of scheduling user equipment, a multiple antenna network node and computer program are disclosed. The method comprises: estimating at least one access network node channel within the unlicensed band between at least one access node operable to transmit in the unlicensed band, such as a WiFi Access Point, and the multiple antenna network node. Estimating a plurality of user equipment channels within the unlicensed band between a plurality of user equipment and the multiple antenna network node. Determining a degree of channel correlation of each of the plurality of user equipment channels and the at least one access node channel. Selecting at least one of the multiple user equipment to be scheduled, using the degree of channel correlation as a selection parameter, a lower degree of channel correlation increasing a user equipment's chance of being selected. In this manner the interference that LTE transmissions from and to scheduled UEs create on the at least one access node is reduced.

11 Claims, 4 Drawing Sheets

(51) Int. Cl.
    *H04B 7/0452*    (2017.01)
    *H04W 16/14*    (2009.01)
    *H04W 72/04*    (2009.01)

(56) References Cited

OTHER PUBLICATIONS

Qualcomm Incorporated, "Measurements of unknown WLANs," $3^{rd}$ Generation Partnership Project (3GPP), 3GPP TSG RAN WG2, R2-168687, XP051178238, Reno, NV, USA, 2016.

Muhammad Imadur Rahman et al., "License-exempt LTE systems for secondary spectrum usage: scenarios and first assessment," 2011 IEEE International Symposium on Dynamic Spectrum Access Networks (DySPAN), pp. 349-358, 2011.

Qualcomm Technologies, Inc., Qualcomm Research LTE in Unlicensed Spectrum: Harmonious Coexistence with Wi-Fi, pp. 1-19, 2014.

"$3^{rd}$ Generation Partnership Project; Technical Specification Group Radio Access Network; Study on Licensed-Assisted Access to Unlicensed Spectrum; (Release 13)," 3GPP TR 36.889 V13.0.0, pp. 1-87, (Jun. 2015). Annex B1, pp. 1-126. Annex B2 pp. 1-53. Annex B3 pp. 1-20.

International Search Report for PCT/EP2017/079508 dated Feb. 14, 2018.

\* cited by examiner

SCHEDULING USER EQUIPMENT IN THE UNLICENSED BAND

FIELD OF THE INVENTION

The invention relates to the field of unlicensed band communications and in particular, to scheduling user equipment so as to reduce interference between signals from different nodes each using the band.

BACKGROUND

The use of the unlicensed spectrum by mobile network operators, particularly in the 5 GHz band, has recently been attracting considerable attention, and vendors and operators are already actively studying its viability for long term evolution (LTE)/4G cellular networks.

The use of the unlicensed spectrum for cellular operation represents a significant change in cellular network deployment and management, and there are, at this stage, still many open questions in terms of business case, reliability of the communication link, and technology as a whole. A major aspect of ongoing discussions is the regulatory requirements to provide fair coexistence with other technologies working in the unlicensed spectrum, such as Wi-Fi.

Current Coexistence Approaches

Since Wi-Fi relies on a contention-based access, Wi-Fi devices will not start a transmission while a cellular base station (BS) is transmitting. Two main approaches are currently being considered to ensure coexistence between cellular BSs and Wi-Fi devices in the unlicensed band. One approach is Carrier Sense Adaptive Transmission (CSAT), where an LTE BS schedules transmissions periodically, leaving idle times between consecutive transmissions to allow Wi-Fi devices to transmit. However, a Wi-Fi transmission may start towards the end of an idle period, and so overlap with the start of an LTE BS transmission. Such collisions reduce both LTE and Wi-Fi throughput. An alternative to CSAT is Listen Before Talk (LBT), in which the LTE BS senses the channel using energy detection for a designated time before starting transmissions in the unlicensed band. However, since the transmission opportunities obtained will typically be misaligned with an LTE subframe boundary, the LTE BS cannot start transmissions until the next subframe boundary is reached, and it keeps the channel occupied via reservation/jamming signals which represent a significant overhead (e.g., up to 1 ms out the 4 ms of the maximum transmission opportunity in Japan).

It would be desirable to provide scheduling of user equipment in the unlicensed band which reduced interference between signals from scheduled user equipment and other nodes operating in the unlicensed band.

SUMMARY

A first aspect of the present invention provides a method performed at a multiple antenna network node, of scheduling user equipment within an unlicensed band, said method comprising: estimating at least one access node channel within said unlicensed band between at least one access node operable to transmit in said unlicensed band and said multiple antenna network node; estimating a plurality of user equipment channels within said unlicensed band between a plurality of user equipment and said multiple antenna network node; determining a degree of channel correlation of each of said plurality of user equipment channels and said at least one access node channel; selecting at least one of said multiple user equipment to be scheduled, using said degree of correlation as a selection parameter, a lower degree of correlation increasing a user equipment's chance of being selected.

The inventors of the present invention recognised that when scheduling user equipment within the unlicensed band, rather than simply using a contentious based technique such as detecting when a channel is free, and in effect ignoring properties of other nodes transmitting in this band, if these properties are taken into account when scheduling the user equipment then interference can be reduced and the unlicensed band can be used more effectively. In particular, where a multiple antenna network node is transmitting signals, then this node has a number of spatial degrees of freedom that can be exploited to reduce interference. Precoding operations can be performed by the multiple antenna network node to form beams in different directions. Taking this property into consideration when scheduling user equipment can lead to more effective use of the unlicensed spectrum.

In co-pending European application 16193756.0, a method to enhance coexistence in the unlicensed band by using massive MIMO (mMIMO) BSs was proposed. We here denote this approach as mMIMO-U. Specifically, the mMIMO degrees of freedom (d.o.f.) that exist when the number of antennas is larger than the number of users to be served can be used to enhance coexistence by pointing radiation pattern nulls towards neighboring Wi-Fi devices (both access points and user terminals since UL and DL directions access the same spectrum resources), so that the interference generated towards and from these Wi-Fi devices is controlled and reduced. This allows the mMIMO-U BS and the Wi-Fi devices to use the same unlicensed band simultaneously with suppressed interference, thus facilitating co-existence between technologies. However, unlicensed operations when using the proposed mMIMO-U approach are less efficient in several cases (i) when one of the mMIMO-U UEs is in the direction of a Wi-Fi device, or (ii) when the sum of the number of scheduled mMIMO-U UEs and the number of spatial nulls to suppress interference at Wi-Fi devices exceeds the total available d.o.f. In fact, in the two above cases the mMIMO-U BS may not be able to preserve the quality of both the nulls towards the Wi-Fi channel subspace and the beams towards its UE channel subspace.

In a mMIMO-U network with (i) several UEs experiencing various channel propagation conditions, and (ii) several nearby Wi-Fi devices, allocating transmission resources both fairly and efficiently in the unlicensed band is a challenging problem. No scheduling algorithms are currently available that target mMIMO-U operations. In general, existing scheduling algorithms are designed for BSs operating in the licensed band, where Wi-Fi operations do not interfere and are thus not taken into account. These conventional scheduling algorithms can be mainly classified into the following three categories.

Round Robin Schedulers:

A Round Robin scheduler treats the UEs equally regardless of their channel quality, allocating them the same amount of resources. This criterion ignores and does not attempt to maximize the network throughput achieved.

Opportunistic Schedulers:

An opportunistic scheduler selects the UE with the best channel quality, aiming at maximizing the overall throughput only. This approach can increase system throughput remarkably compared to Round Robin schedulers. However, the gain achieved by opportunistic schedulers comes at the cost of fairness, since UEs with relatively bad channel qualities may never be scheduled. This may not be acceptable for certain scenarios, e.g., delay-sensitive applications.

Proportional Fair Schedulers:

A Proportional Fair (PF) scheduler attempts to maximize the throughput while simultaneously reinforcing a degree of fairness in serving all UEs. The PF scheduling metric weighs each UE's potential instantaneous throughput by its past average throughput. UEs are ranked according to the metric, and those UEs with maximum metric are scheduled for transmission.

Conventional schedulers select UEs according to their channels in the unlicensed band and/or to their previous throughput, but they do not consider the channel correlation between UEs and Wi-Fi devices.

The drawback of such conventional scheduling is that the channel matrix becomes poorly conditioned when a mMIMO-U BS schedules a UE whose channel is correlated with the channel of one or more Wi-Fi devices. In this case, it is difficult for the mMIMO-U BS to serve the UE while suppressing the interference generated at the Wi-Fi devices. As a result, the rate achieved by the selected UE may be poor and/or significant interference may be generated towards one or more Wi-Fi devices (potentially violating the unlicensed band regulations).

The proposed invention seeks to address the above drawbacks by proposing a new scheduling method for multiple antenna nodes such as massive MIMO operating in the unlicensed band. This application seeks to provide a method, network node and computer program that enhances the sharing of the spectrum in the unlicensed band both between nodes using the same technology and those that use different technologies.

The multiple antenna network node estimates channel(s) between the network access node(s) and itself that are used by network access node(s) for unlicensed band communications. These network access nodes may in some embodiments be user equipment using Wi-Fi or Wi-Fi access points that use listen before talk when transmitting on the unlicensed band. It also estimates channels between itself and the user equipment with which it communicates. The multiple antenna network node then determines the degree of correlation between the channels to the user equipment and those to the network access nodes and selects user equipment that communicate on channels that are not closely correlated with those channels used by the access nodes. In this way the invention considers channel correlation in its scheduling decisions. Making use of this property in scheduling decisions allows for devices to use the same resources at the same time with reduced interference thereby making more effective use of the available spectrum and increasing both reliability and throughput of communications.

In some embodiments, said step of estimating said at least one channel comprises estimating a plurality of access node channels within said unlicensed band between a plurality of access network nodes and said multiple antenna network node; and said step of determining said degree of correlation comprises determining a degree of correlation of each of said plurality of user equipment channels with one of said plurality of access node channels that is most closely correlated with said user equipment channel.

Where there are a plurality of access network nodes, then when determining the degree of channel correlation between the channels used for signals of the user equipment and those of the access nodes, the degree of correlation that is useful for the selection of the user equipment is the degree of correlation of the user equipment channel and the access node channel that it is most closely correlated with it. This is because the scheduling of user equipment is being done to reduce interference and interference will be highest between most closely correlated channels. Thus when determining whether a user equipment should be scheduled or not, it is advantageous to determine how closely correlated it is to the access node channel with which it is most closely correlated.

In some embodiments, the method comprises a further step of determining which of said plurality of access node channels comprises transmit energy above a predetermined threshold value, and disregarding access node channels comprising transmit energy below said predetermined threshold value; and said step of determining said degree of correlation comprises determining a degree of correlation of each of said plurality of user equipment channels with one of said plurality of access node channels that transmits energy above said predetermined threshold and that is most closely correlated with said channel of said user equipment.

When determining how closely correlated a user equipment channel is to an access node channel, in some cases it may be advantageous to disregard some of the access node channels where their transmit energy is not high. In this regard, although in some cases user equipment may be quite closely correlated with an access node channel, it may be that the transmit energy of that access node channel perhaps owing to its distance from the network node or to its properties, may be such that the interference that user equipment will suffer from this access node may be low, even if they are quite closely correlated. Thus, in such a case, it may be that another access node with higher transmit energy but less closely correlated with the user equipment should be the channel that is considered when determining whether or not to schedule the user equipment.

In some embodiments, said step of estimating said at least one access node channel, comprises estimating an aggregated channel value of a plurality of access node channels; and said step of determining said degree of correlation comprises determining a degree of correlation of each of said plurality of user equipment channels with said aggregated access point channel.

In some embodiments, rather than comparing each user equipment with the most closely correlated access node channel, they may be compared with an aggregate of these channels. The aggregate is found for the co-variance of the vectors of the channels received from the access points and this generates a subspace aggregate of these channels. When determining which user equipment to schedule user equipment not within this subspace can be scheduled. Which user equipment these are is determined by determining the degree of correlation for each of the user equipment channels with the aggregated access point channel and where there is a low degree of correlation, and then the user equipment may be scheduled. It should be noted that the aggregate subspace will have eigenvalues, in particular directions and where the eigenvalues are small, then that particular direction may not be considered and a user equipment that may be quite closely correlated with that direction, may be scheduled. This is similar to ignoring the access point node with low transmit power. In some embodiments, beam direction null signals may be pointed at the subspace aggregate of the access point channels.

In some embodiments, the method further comprises determining a number of spatial degrees of freedom required to suppress interference from said at least one access network node to below a predetermined level; determining a maximum number of user equipment that can be scheduled, said maximum number being equal to said number of spatial degrees of freedom required for suppressing interference subtracted from a number of antenna of said multiple antenna network node; and said step of selecting said at least one user equipment, comprises selecting a number of user equipment that is equal to or less than said maximum number of user equipment, for scheduling.

It should be noted that although a conventional scheduler distributes time and frequency resources among the active users, in the multi-user mMIMO scenario, the allocation of the radiation pattern beams (the degrees of freedom) also plays a crucial role and needs to be considered. More specifically:

Conventional schedulers applied to mMIMO-U would choose the number of UEs to be selected and spatially multiplexed irrespective of the number of Wi-Fi devices operating in the unlicensed band, thus ignoring the number of spatial nulls that may be required to suppress interference to such Wi-Fi devices.

The total number of spatial d.o.f. is determined by the number of active antennas at the multiple antenna node and where interference is to be kept low should not be exceeded by the sum of (i) the number of spatial nulls required to suppress interference at Wi-Fi devices to acceptable levels and (ii) the number of spatially multiplexed beams. In this specific unlicensed context, it would be desirable if the scheduler jointly considered how to allocate nulls and beams towards mMIMO-U UEs and Wi-Fi devices respectively. Although this would reduce the number of active communication links available (i.e number of mMIMO-U UEs scheduled simultaneously), it would also reduce interference and take account of other devices operating in the unlicensed band. This is not covered by conventional scheduler algorithms and the result of ignoring this may be poor coexistence performance of the two technologies.

Thus, in some embodiments when determining the number of user equipment that can be scheduled, initially a number of spatial degrees of freedom required to supress interference from the access network nodes is determined. This will depend on the number of access nodes, their location and the strength of their signals. When it is determined how many spatial degrees of freedom are required to supress interference from these nodes, this is generally done by directing null signal beams towards these nodes, then one can determine the number of orthogonal beams that remain that can be used for scheduling user equipment. The maximum number of user equipment that can be scheduled will be the maximum number of spatial degrees of freedom required for suppressing interference, subtracted from the maximum number of spatial degrees of freedom which latter is equal to the number of antenna in most cases. Thus, where there are many access network nodes, generally fewer user equipment can be scheduled than where there are a low number of access network nodes.

In some embodiments, said step of selecting said user equipment comprises determining an achievable throughput for each of said plurality of user equipment, said selecting step comprising selecting a user equipment in dependence upon both their achievable throughput, and their determined degree of correlation to said at least one access point channel; a higher achievable throughput and a lower degree of correlation each increasing a user equipment's chance of being selected.

In addition to the degree of correlation, there are other factors which may influence a selection of user equipment such as achievable throughput. In this regard, achievable throughput is dependent on the channel quality between the user equipment and the network node. Where user equipment with higher achievable throughput are scheduled, then clearly the amount of data that can be transmitted is increased. However although this increases throughput, there is no fairness in this determination such that it may be that some user equipment are never selected if only correlation and achievable throughput are the factors considered. This may be acceptable where user equipment can be scheduled using other technologies such as transmitting signals on the licensed frequency band. Where there are no other means to transmit to the user equipment, then such a scheme would probably not be acceptable although it would be efficient from a throughput point of view.

In other embodiments, said step of selecting said user equipment comprises determining an achievable throughput and an average historical throughput for each of said plurality of user equipment, said selecting step comprising selecting a user equipment in dependence upon both their ratio of achievable to historical throughput, and their determined degree of correlation to said at least one access point channel; a higher ratio and a lower degree of correlation each increasing a user equipment's chance of being selected.

Where fairness is an issue, then rather than simply using the achievable throughput as one of the factors, rather a combination of the achievable throughput and an average historical throughput is used as factors in scheduling. In this regard, the average historical throughput is a measure of how much the user equipment has been scheduled recently and thus, a ratio between the achievable throughput and the average historical throughput may be a good parameter to base selection on. Thus, in some embodiments, a higher ratio of these numbers and a lower degree of correlation may be used as parameters which increase a user equipment's chance of being selected.

In some embodiments, the method comprises a further step of receiving from a user equipment an indication of a strength of a signal received from said multiple antenna network node and a strength of a signal received from said at least one access network node; wherein said step of selecting said user equipment for scheduling comprising using a relative signal strength of said signal received from said at least one access network node compared to a signal strength received from said multiple antenna network node as a selection parameter, a higher relative signal strength decreasing a chance of said user equipment being selected.

Although the methods described above provide a way of scheduling user equipment that reduce interference between signals transmitted from the network node to these devices, it does not take into account interference which may arise from signals transmitted by the user equipment and access nodes themselves. In order to address this, in some embodiments the step of selecting user equipment may take account of the strength of a signal received by the user equipment from a neighbouring access network node. Thus, where this signal strength is high and in particular high compared to the strength of signal received from the network node, then although interference between signals transmitted from the network node to these devices may be controlled to some extent by using uncorrelated channels, signals transmitted from the access node will be received strongly at the user equipment and will cause interference. Thus, this is also a factor that may be important when scheduling the user equipment and where this signal is strong compared to the signal from the network node, then it may be advisable not to schedule the user equipment and thus, in some embodiments, this factor is taken account of in the scheduling decision.

It should be noted that the strength of signals from other network nodes in the vicinity may also be taken into account when determining whether to schedule the user equipment. In this regard, the strength of the signal from the network node compared to the sum of the other signals may be the factor that is used in the determination of whether user equipment should be scheduled or not. It is indeed the sum of the signals from the other nodes that is important for interference and thus, in some embodiments, the user equipment may transmit an indication of the strength of a signal received not only from the multiple antenna network node—the desired signal, but also from signals received from other network nodes which are undesired or interfering signals.

In some embodiments, a user equipment with a degree of correlation above a predetermined value is not selected for scheduling.

In some cases, there may be a limit value for correlation above which a user equipment is not selected. This may be done to ensure that interference is maintained below a particular level.

In some cases, this predetermined value is set at said multiple antenna network node in dependence upon a number of user equipment awaiting scheduling, said predetermined value being reduced in response to a large number of user equipment awaiting scheduling.

The predetermined correlation value above which a user equipment is not selected will determine the degree of interference that it experiences. There may be occasions where there are many user equipment awaiting scheduling and thus, one can set this limit value to be quite low such that interference is kept very low and still the maximum number of user equipment are scheduled. Where there are fewer user equipment to be scheduled then in order to maintain throughput and schedule at least some user equipment, it may be desirable to lower one's standards and allow higher interference and a higher degree of correlation to be permitted.

In some embodiments, the method comprises a further step of following selecting said user equipment for scheduling, transmitting to said selected user equipment by performing precoding operations to form a predetermined number of beams, said beams including beams directed towards said selected user equipment and at least one null signal beam on which no signal is transmitted corresponding to said at least one channel between said at least one access point and said multiple antenna network node.

Once the user equipment have been scheduled, then downlink communications are transmitted to them from the multiple antenna network node by using precoding operations to form beams in that particular direction. It is in this way that the orthogonal channels or near orthogonal channels are generated. The channels to the access point where interference is to be supressed have null signal beams such that where beam forming is in this direction, no signals are transmitted thereby reducing interference felt by these nodes.

In some embodiments, said multiple antenna network node is operable to transmit signals in both a licensed and an unlicensed band.

In some cases the network node may transmit signals in both the licensed and unlicensed band and may, for example, be a base station. In this case, the selecting may comprise a further step of selecting user equipment not selected for scheduling in the unlicensed band for scheduling in the licensed band. The ability to schedule user equipment in both the licensed and unlicensed band allows the greater flexibility in particular where interference suppression is being practiced. Thus, user equipment identified as having channels that correlate closely with access nodes, can be scheduled in the licensed bands and thereby not be starved of data and yet not cause interference to the access node. Other user equipment that are deemed to have channels towards the multiple antenna node that are highly orthogonal to those of the access nodes may be selected for scheduling in the unlicensed band.

A second aspect of the present invention provides a computer program which when executed by a processor is operable to control the processor to execute the method according to a first aspect to the present invention.

A third aspect of the present invention provides a multiple antenna network node operable to transmit in an unlicensed band, said network node comprising: estimating circuitry operable to estimate at least one access node channel within said unlicensed band between at least one access node and said multiple antenna network node and to estimate a plurality of user equipment channels within said unlicensed band between a plurality of user equipment and said multiple antenna network node; scheduling circuitry operable to determine a degree of channel correlation of each of said plurality of user equipment channels and said at least one access node channel and to select at least one of said multiple user equipment to be scheduled in dependence upon an algorithm, said degree of channel correlation being a parameter within said algorithm, a lower degree of channel correlation increasing a user equipment's chance of being selected.

In some embodiments, said estimating circuitry is operable to estimate a plurality of access node channels within said unlicensed band between a plurality of access network nodes and said multiple antenna network node; and said scheduling circuitry is operable to determine said degree of correlation by determining a degree of correlation of each of said plurality of user equipment channels with one of said plurality of access node channels that is most closely correlated with said user equipment channel.

In some embodiments, said scheduling circuitry is operable to determine which of said plurality of access node channels comprises transmit energy above a predetermined threshold value, and to disregard access node channels comprising transmit energy below said predetermined threshold value; and to determine a degree of correlation of each of said plurality of user equipment channels with one of said plurality of access node channels that transmits energy above said predetermined threshold and that is most closely correlated with said channel of said user equipment.

In some embodiments, said estimating circuitry is operable to estimate said at least one access node channel by estimating an aggregated channel value of a plurality of access node channels; and to determine said degree of correlation by determining a degree of correlation of each of said plurality of user equipment channels with said aggregated access point channel.

In some embodiments, said network node further comprises determining circuitry for determining a number of spatial degrees of freedom required to suppress interference from said at least one access network node to below a predetermined level and to determine a maximum number of user equipment that can be scheduled, said maximum number being equal to said number of spatial degrees of freedom required for suppressing interference subtracted from a number of antenna of said multiple antenna network node; and said scheduling circuitry is operable to select said at least one user equipment, by selecting a number of user equipment that is equal to or less than said maximum number of user equipment.

In some embodiments, said scheduling circuitry is operable to determine an achievable throughput for each of said plurality of user equipment, and to selecting a user equipment in dependence upon both their achievable throughput, and their determined degree of correlation to said at least one access point channel, a higher achievable throughput and a lower degree of correlation each increasing a user equipment's chance of being selected.

In other embodiments, said scheduling circuitry is operable to determine an achievable throughput and an average historical throughput for each of said plurality of user equipment, said scheduling circuitry selecting a user equipment in dependence upon both their ratio of achievable to historical throughput, and their determined degree of correlation to said at least one access point channel, a higher ratio and a lower degree of correlation each increasing a user equipment's chance of being selected.

In some embodiments, said network node further comprises a receiver for receiving from a user equipment an indication of a strength of a signal received from said multiple antenna network node and a strength of a signal received from said at least one access network node; said scheduling circuitry using a relative signal strength of said signal received from said at least one access network node compared to a signal strength received from said multiple antenna network node as a user equipment selection parameter, a higher relative signal strength decreasing a chance of said user equipment being selected.

In some embodiments, said scheduling circuitry is operable not to select a user equipment with a degree of correlation above a predetermined value for scheduling.

In some embodiments, said predetermined value is determined at said multiple antenna network node in dependence upon a number of user equipment awaiting scheduling, said predetermined value being reduced in response to a large number of user equipment awaiting scheduling.

In some embodiments, said network node further comprises output circuitry operable to perform precoding operations on signals to form a predetermined number of beams, said beams including beams directed towards said selected user equipment and at least one null signal beam on which no signal is transmitted corresponding to said at least one channel between said at least one access point and said multiple antenna network node.

In some embodiments said multiple antenna network node is operable to transmit signals in both a licensed and an unlicensed band. In some embodiments said multiple antenna network node comprises a base station, in other embodiments said multiple antenna network node comprises a multiple antenna access point such as a Wi-Fi access point. In either case said the multiple antenna network node comprises of precoding logic operable to form beams in different directions.

In some embodiments said access node comprises a Wi-Fi device such as a Wi-Fi access point or a user equipment communicating with an access point.

In some embodiments, said scheduling circuitry is further operable to select user equipment that are not selected for scheduling in said unlicensed band, for scheduling in said licensed band.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
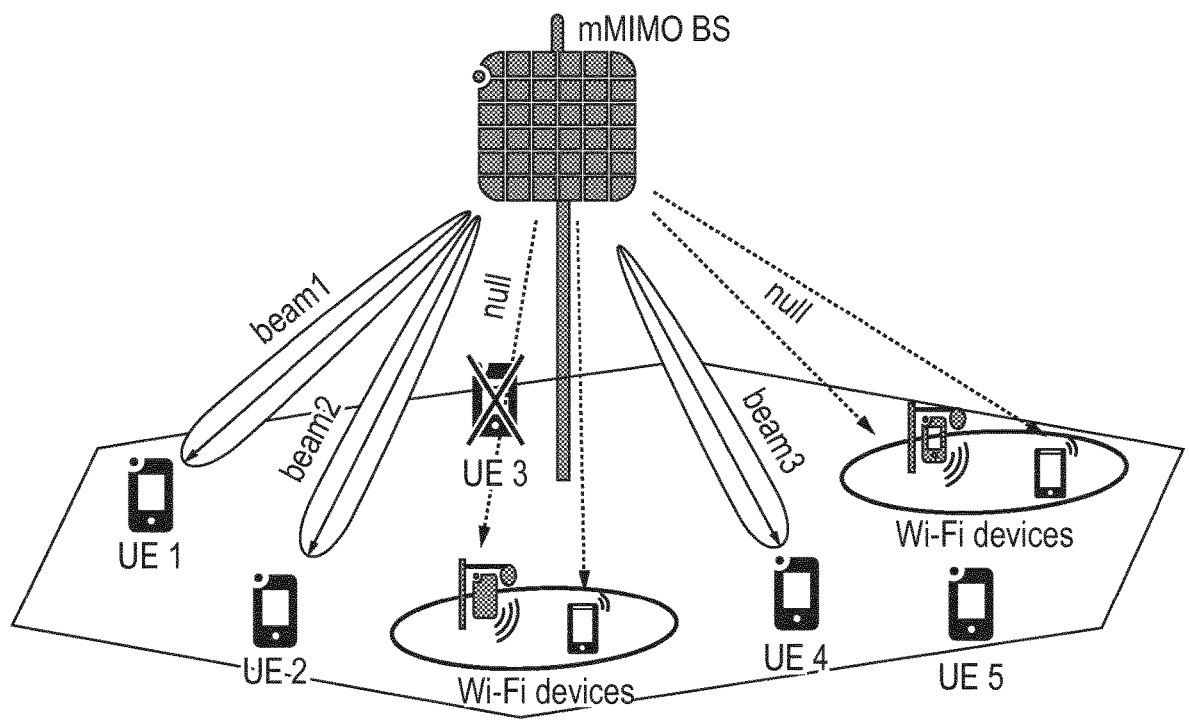
FIG. 1 illustrates an example of a massive MIMO system operating in the unlicensed band (mMIMO-U system), with a total of 5 UEs, 3 scheduled UEs, and 4 coexisting Wi-Fi devices.

Before discussing the embodiments in any more detail, first an overview will be provided.

Embodiments seek to provide scheduling of user equipment that recognize that multiple antenna network nodes can use beamforming when transmitting signals. This technique can be used to provide additional resources, and where the channels of different devices are known, can be used in scheduling decisions to suppress interference between devices sharing the unlicensed spectrum.

Thus embodiments propose a new scheduling algorithm for mMIMO in the unlicensed band that, while associating/scheduling the active UEs to a set of multiplexed beams, accounts for the presence of other devices using the spectrum and schedules user equipment with channels that are not closely correlated with the channels of the other devices thereby reducing interference between the devices even when they are operating at the same time.

In effect the number of orthogonal beams that a multiple antenna network node can generate is related to the number of antennas that it has and provides that number of spatial degrees of freedom. By using one or more of these beams as null signal beams and directing them towards devices such as coexisting Wi-Fi devices where interference is to be suppressed, interference with signals from these devices can be avoided or at least reduced. Other substantially orthogonal or uncorrelated beams can then be used for transmission of signals to user equipment.

Thus, the number of user equipment that can be served is reduced compared to all the beams being used to transmit signals, but the coexistence with other nodes is improved and the contentious based scheduling used by the other devices such as listen before talk is far less likely to be a bar to subsequent transmissions.

In summary, the proposed scheduling method accounts for the number of nulls required to suppress interference at the Wi-Fi devices w.r.t. the total number of spatial d.o.f.

available, as well as for the channel correlation between UEs and Wi-Fi devices operating in the unlicensed spectrum. Given that current technologies in unlicensed bands, such as Wi-Fi, rely on contention-based access, there is a concern that starvation and other forms of unfairness may occur when they co-exist with a schedule-based technology such as LTE-U/LAN MuLTEFire.

Embodiments provide a new scheduling method for mMIMO-U that overcomes the drawbacks of conventional scheduling methods as follows.

- Instead of ignoring the number of Wi-Fi devices operating in the unlicensed band, it takes them into account in the process of choosing the number of UEs to be selected and spatially multiplexed.
- Instead of ignoring the channel correlation between UEs and Wi-Fi devices, it takes it into account in the process of selecting the UEs for transmission in the unlicensed band.

The proposed scheduler of embodiments includes the following basic steps.

Step 1)
The mMIMO-U BS acquires channel state information (CSI) from all nearby Wi-Fi devices. This can be obtained either (i) in a quantized form via a discrete beam sweeping method, or (ii) in an exact manner via new Wi-Fi pilot signals or enhanced mMIMO-U BS signal processing capabilities. The two above methods will be detailed in Embodiment 1 and Embodiment 2, respectively.

Step 2)
The mMIMO-U BS exploits the above CSI to determine the number of spatial degrees of freedom needed to suppress interference at all nearby Wi-Fi devices. The mMIMO-U BS calculates the maximum number of $K_{max}$ that can be scheduled in the unlicensed band as the total number of available spatial d.o.f. minus the number of spatial d.o.f. needed to suppress interference at the Wi-Fi devices.

Step 3)
The mMIMO-U BS selects the UEs whose channels are semi-orthogonal to those of the Wi-Fi devices. A correlation threshold is used for this purpose. UEs that are not selected will be scheduled for transmission either (i) in the licensed band, (ii) in the unlicensed band with regular CSAT/LBT procedures, or (iii) waiting to be re-scheduled in another transmission interval where the channel may have varied (e.g., the subset of transmitting Wi-Fi devices is changed from the previous transmission interval).

Step 4)
The mMIMO-U BS ranks the selected UEs according to a new metric $\gamma_k$ that accounts for (i) a measure $0 \le \rho_k \le 1$ of their channel correlation, (ii) their achievable throughput $T_k$, and (iii) their past average throughput $\overline{T_k}$, as follows $$\gamma_k = (1 - \rho_k) \frac{T_k}{\overline{T_k}}.$$

A possible choice for the channel correlation measure $\rho_k$ can be the maximum correlation between the k-th UE and any of the Wi-Fi devices, though other criteria may be applied. It is worth noting that the above metric trades off throughput rate maximization with UE fairness and interference caused at Wi-Fi devices.

Step 5)
The mMIMO-U BS schedules for transmission up to the $K_{max}$ UEs with the highest metric $\gamma_k$.

The proposal provides significant performance gain over the best existing solutions.

With conventional scheduling algorithms, a mMIMO-U BS may select a number of UEs that exceeds the total number of spatial d.o.f. available minus the number of spatial nulls required to suppress interference at Wi-Fi devices. This may degrade the rate achievable by the selected UEs while creating interference at several Wi-Fi devices possibly violating the unlicensed band regulations. With proposed embodiments, a mMIMO-U BS limits the number of selected UEs within a transmission interval to a maximum given by the total number of spatial d.o.f. available minus the number of spatial nulls required to suppress interference at Wi-Fi devices.

With conventional scheduling algorithms, a mMIMO-U BS may select UEs whose channel is correlated with the channel of one or more Wi-Fi devices. This may degrade the rate achievable by the selected UEs while creating interference at several Wi-Fi devices possibly violating the unlicensed band regulations. With proposed embodiments, a mMIMO-U BS selects those UEs whose channel is highly uncorrelated with the channel of all Wi-Fi devices, thus facilitating spatial multiplexing and interference suppression.

System Model: mMIMO-U

As depicted in FIG. 1, a mMIMO BS and four Wi-Fi devices (two access points and two stations) are operating in the unlicensed band in time-division duplexing (TDD) mode. The mMIMO-U BS is equipped with multiple antennas and aims at communicating with a set of five UEs in downlink. The spatial d.o.f. made available by the plurality of transmit antennas allow the BS to simultaneously serve a subset of the UEs through spatial multiplexing (by generating signal beams) while keeping the interference caused at the Wi-Fi devices low (by pointing spatial nulls towards them). While the total number N of spatial d.o.f. is fixed, the number of served UEs can be chosen adaptively by the scheduler.

Embodiment 1: UE Scheduling with Quantized Wi-Fi CSI Estimation

Step 1)
In the first embodiment, the mMIMO BS acquires CSI for all nearby Wi-Fi devices in a quantized form. The quantized CSI acquisition may be preferred when the number of Wi-Fi channel estimates to be performed is vast, hence dividing the full spatial range into a limited number of L different acquisitions reduces the complexity. In the case of line-of-sight (LOS) propagation environments, the above quantized channel estimation corresponds to a discrete beam sweeping procedure, as illustrated in FIG. 2.

Figure 2:
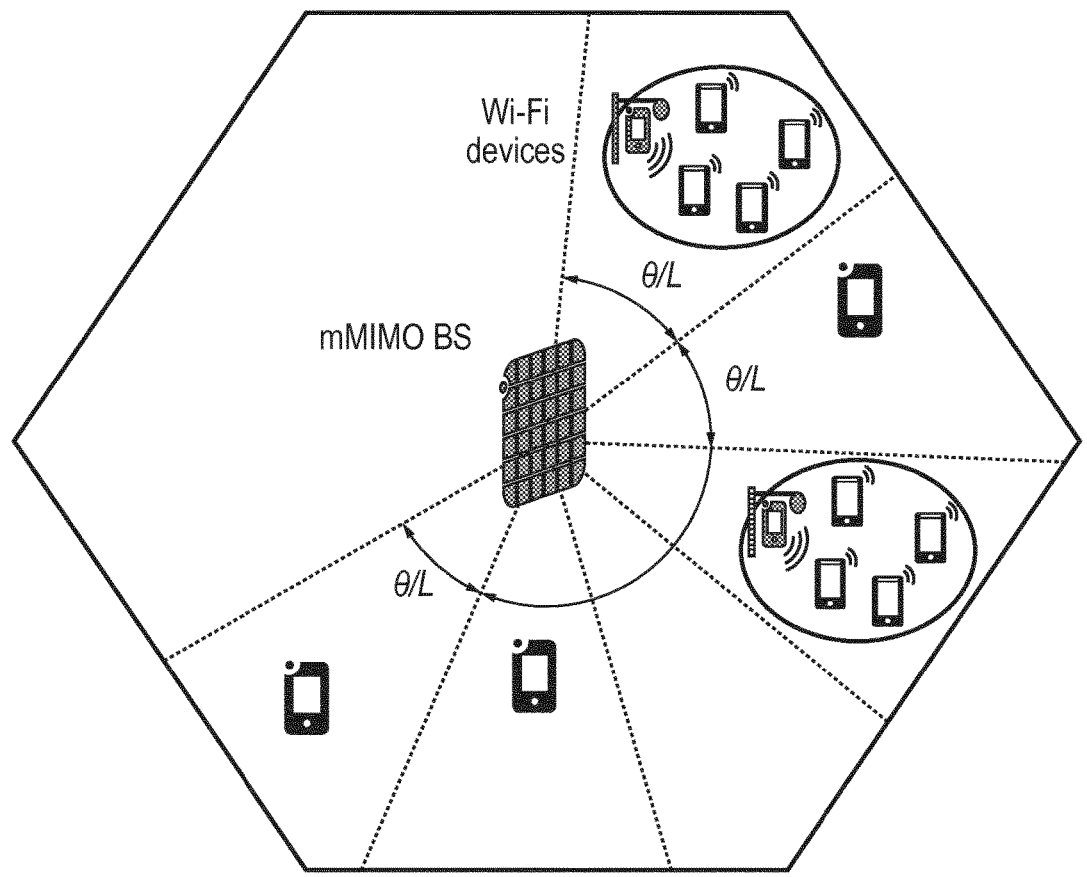
FIG. 2 illustrates an example of discrete beam sweeping for quantized Wi-Fi CSI acquisition.

In FIG. 2, the full mMIMO-U bearing range $\theta$ is divided into L segments, on which a selective channel estimation is performed on a coverage angle of $\theta/L$, and the transmitting Wi-Fi devices positioned in each segment are tracked via energy detection. In a non-LOS scenario with fading, the above corresponds to having a codebook of L quantized channel vectors and measuring the energy received on the spatial direction of each of these vectors. We note that an inherent tradeoff exists between (i) increasing L and hence the accuracy of the CSI acquired, and (ii) limiting the complexity of the acquisition process.

Figures 3, 4:
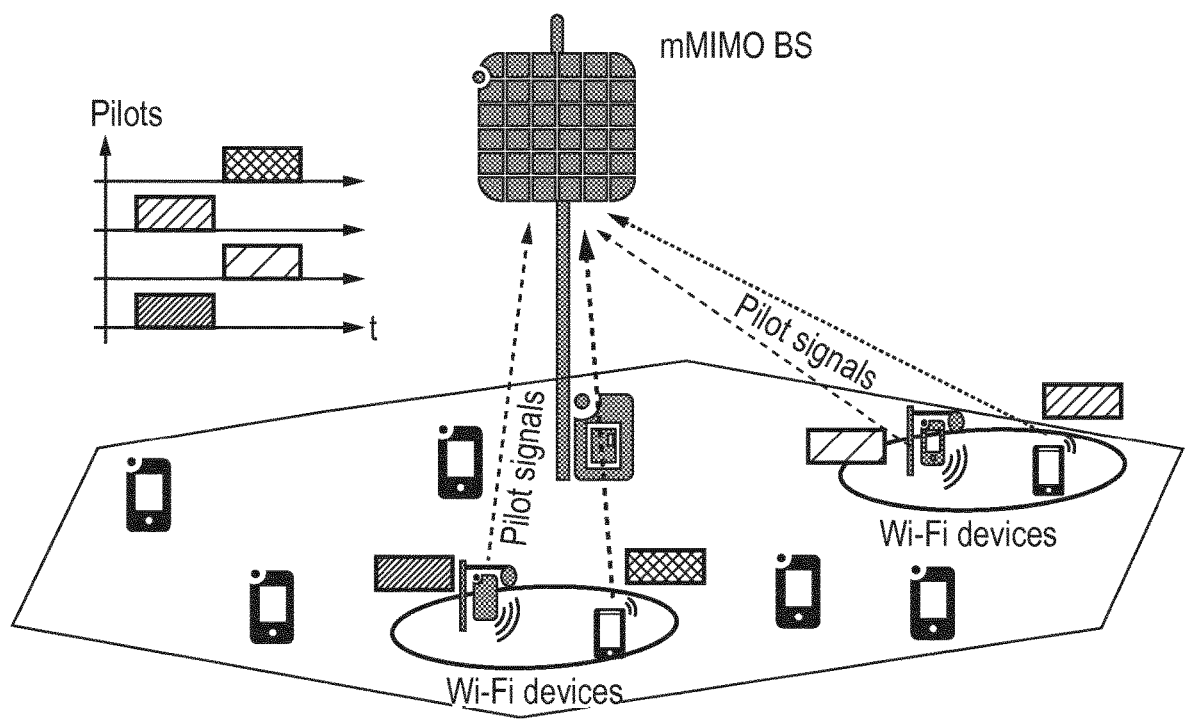
FIG. 3 illustrates an example of quantized Wi-Fi and UE channel estimation with a codebook of size $L=8$.
FIG. 4 illustrates an example of channel estimation using new pilot signals at Wi-Fi devices.

Once the mMIMO-U BS has acquired quantized Wi-Fi CSI, it marks each quantized channel direction with X if the received energy from Wi-Fi devices is larger than a certain threshold. For each UE, the mMIMO-U BS then marks with X the channel from the quantized codebook that best approximates that UE's channel. The above procedure is illustrated in FIG. 3. It is desirable that the codebook size L is large enough to allow for an accurate approximation.

Step 2)

The mMIMO-U BS determines the number of spatial d.o.f. needed to suppress interference at all nearby Wi-Fi devices. In the above example, 4 spatial d.o.f. are needed, since the Wi-Fi presence is detected in 4 spatial dimensions, namely codebook indices 1, 3, 4, and 7. Assuming as an example that N=7 spatial d.o.f. are available at the mMIMO-U BS, a maximum of $K_{max}$=N−4=3 UEs can be scheduled in the unlicensed band.

Step 3)

Out of the 5 available UEs, the mMIMO-U BS selects the UEs whose channels are semi-orthogonal to those of the Wi-Fi devices. In the above example, UEs 1, 2, 4, and 5 are selected. UE 3 is discarded since its channel lies on the same spatial dimension as one or more Wi-Fi devices (codebook index 3). UE 3 can be scheduled for transmission either (i) in the licensed band, (ii) in the unlicensed band with regular CSAT/LBT procedures, or (iii) waiting to be re-scheduled in another transmission interval where the channel may have varied (e.g., Wi-Fi nodes are not there anymore or stopped transmitting).

Step 4)

The mMIMO-U BS can now rank the 4 selected UEs according to the metric $\gamma_k$ defined in the previous section. We note that metric $\gamma_k$ accounts for the channel correlation with all Wi-Fi devices, the achievable throughput, and the past average throughput.

Step 5)

Finally, the mMIMO-U BS schedules for transmission up to Kmax=3 UEs with the highest metric $\gamma_k$ out of the selected UEs, for example UEs 1, 2, and 4. During the data transmission phase, the mMIMO BS performs transmit beamforming, pointing spatial nulls towards all directions where the presence of Wi-Fi devices was detected, and creating beams towards UEs 1, 2, and 4 (see FIG. 1). UE 5 can be scheduled for transmission either (i) in the licensed band, (ii) in the unlicensed band with regular CSAT/LBT procedures, or (iii) in a subsequent transmission interval when the channel may have varied.

Embodiment 2: UE Scheduling Under Exact Wi-Fi CSI Estimation

Step 1)

Figure 5:
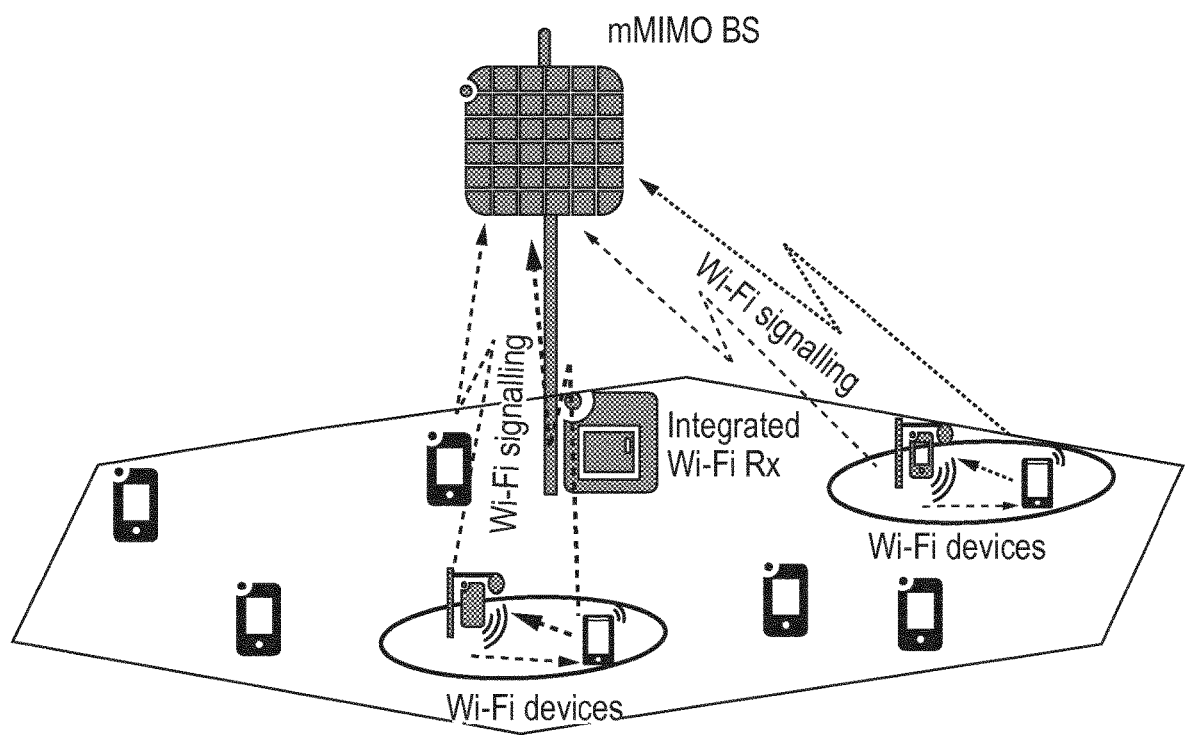
FIG. 5 illustrates an example of channel estimation using enhanced signal processing capabilities at the mMIMO BS.

In the second embodiment, CSI for the nearby Wi-Fi devices is acquired in an exact, non-quantized manner. This can be accomplished by means of either new Wi-Fi pilot signals or enhanced mMIMO-U BS signal processing capabilities, as illustrated in FIG. 4 and FIG. 5.

Step 2)

Thanks to the aforementioned signals/capabilities, the mMIMO-U BS is also able to determine the number of nearby Wi-Fi devices. Then, the mMIMO-U BS calculates the maximum number of UEs $K_{max}$ that can be scheduled in the unlicensed band as the total number of available spatial d.o.f. minus the number of spatial d.o.f. needed to suppress interference at the Wi-Fi devices.

Step 3)

Out of the 5 available UEs, the mMIMO-U BS selects the UEs whose channels are semi-orthogonal to those of the Wi-Fi devices, by using a correlation threshold. UEs that are not selected will be scheduled for transmission either (i) in the licensed band, (ii) in the unlicensed band with regular CSAT/LBT procedures, or (iii) in a subsequent transmission interval when the channel may have varied (e.g., the subset of transmitting Wi-Fi devices is changed from the previous transmission interval). A possible choice for the channel correlation measure can be the maximum correlation between each UE and any of the Wi-Fi devices. The value of the correlation threshold should be the object of optimization, and should depend on other system parameters. For example, when the number of available UEs is large, a low (conservative) correlation threshold should be preferred. In fact, a low correlation threshold implies that only UEs that are almost orthogonal (i.e. with very low correlation) to the Wi-Fi devices are eligible to be scheduled. Where the UE number is large this provides a sufficient number of eligible, well-chosen, UEs. On the other hand, when the number of available UEs is small, a low correlation threshold risks yielding an empty set of eligible UEs. Since with a low number of UEs, there are more d.o.f. per UE available, it may be preferable to relax the orthogonality constraint by using a larger correlation threshold.

Step 4)

The mMIMO-U BS can now rank the 4 selected UEs according to the metric $\gamma_k$ defined in the previous section.

Step 5)

The mMIMO-U BS schedules for transmission the up to the $K_{max}$ UEs with the highest metric $\gamma_k$ out of the selected UEs. During the data transmission phase, the mMIMO-U BS performs transmit beamforming, pointing spatial nulls towards all Wi-Fi devices, and creating beams towards the scheduled UEs (see FIG. 1).

Figure 6:
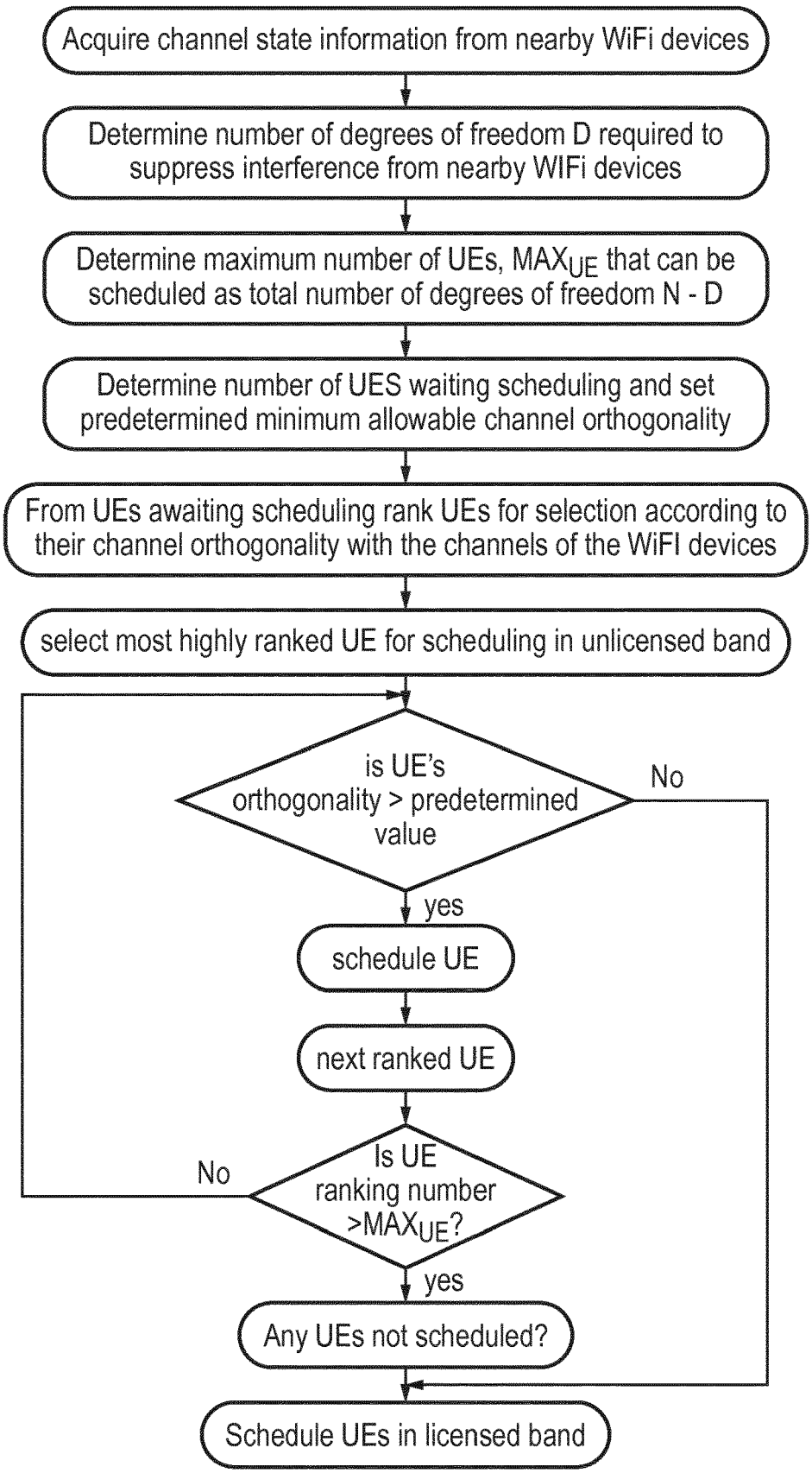
FIG. 6 shows a flow diagram illustrating steps in a method performed at a multiple antenna network node according to an embodiment.

FIG. 6 schematically shows the steps performed at a network node according to an embodiment. Initially channel state information is acquired for nearby Wi-Fi devices. This may be from their pilot signals, where they have them, or from sensing during beam sweeping. Individual channel state information may be acquired or the aggregate Wi-Fi signals and the subspace that they project onto may be determined. The network node then determines the number of degrees of freedom that are required to suppress interference from these Wi-Fi devices. In this regard, the network node may determine that only Wi-Fi devices with a signal strength above a predetermined value require suppression and may ignore the others. Where the aggregate signal has been used, then the size of the eigenvalues of this subspace will determine which portion of this subspace requires suppression.

The maximum number of UEs that can be scheduled is then determined, that being the total number of degrees of freedom of the network node, generally equal to the number of antennas, minus the number of degrees of freedom required to suppress interference from the Wi-Fi devices.

The number of UEs awaiting scheduling and the channel orthogonality requirement is then set based on this number. Where there are many UEs awaiting scheduling then this requirement can be set high as it is likely that all available channels will be allocated even with a high orthogonality requirement and thus, interference can be kept low without affecting throughput. However, where there are fewer UEs requiring scheduling setting the orthogonality requirement too high may result in none or very few being scheduled. In some cases there may be no specific orthogonality limit, orthogonality being used only as a factor determining scheduling, the more orthogonal a channel the more likely the UE is to be scheduled.

The UEs are then ranked based on their channel orthogonality to the channels of the Wi-Fi devices for which interference is to be suppressed. It is then determined if the orthogonality of the most orthogonal is > the predetermined value (where this requirement has been imposed) and if it is, that UE is scheduled and the next ranked UE is then considered, until all the available channels have been used for all UEs with acceptable orthogonality. At this point any remaining UEs may be scheduled using the licensed band.

It should be noted that in the scheduling above the only factor that was considered was channel orthogonality. In other embodiments other factors may also be considered, such as UE throughput. In this case UE's with a higher quality channel or higher throughput are selected in preference to those with a lower throughput. A UE's history may also be considered, with those that have been starved of scheduling recently being prioritized. In the latter case this may be important where the possibility of scheduling in the licensed band is not available. Where it is available it may be acceptable and indeed preferable to never select a UE for unlicensed band scheduling where its orthogonality is not high compared to Wi-Fi devices.

A further factor that may be used in scheduling decisions is the strength of signals received at the UE from the network node, compared to the strength of signals it receives from other nodes, such as Wi-Fi devices and in some cases other cellular network nodes. Where the strength of the signal from the base station at the UE is not high compared to the strength of signals received from other devices then scheduling this UE in the unlicensed band may result in it not being able to receive the signal well due to interference from the neighbouring nodes. Thus, in some embodiments the UE transmits indicators of signal strengths of neighbouring nodes to the multiple antenna network node and it uses these signal strengths in its scheduling decisions. This may be done by disregarding UE's that have a ratio of signal strength from the multiple antenna node to signal strength from interfering nodes that is less than a predetermined value.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a multiple antenna network node, of scheduling user equipment within an unlicensed band, said method comprising:
    estimating at least one access network node channel within said unlicensed band between at least one access node operable to transmit in said unlicensed band and said multiple antenna network node, by estimating an aggregated channel value of a plurality of received access node channels;
    estimating a plurality of user equipment channels within said unlicensed band between a plurality of user equipments and said multiple antenna network node;
    determining a degree of channel correlation of each of said plurality of user equipment channels and said at least one access node channel by determining a degree of correlation of each of said plurality of user equipment channels with an aggregated access node channel;
    selecting at least one of said plurality of user equipments to be scheduled, using said degree of channel correlation as a selection parameter, a lower degree of channel correlation increasing a user equipment's chance of being selected.

2. The method according to claim 1, further comprising:
    determining a number of spatial degrees of freedom required to suppress interference from said at least one access network node to below a predetermined level;
    determining a maximum number of user equipments that can be scheduled, said maximum number being equal to said number of spatial degrees of freedom required for suppressing interference subtracted from a number of antenna of said multiple antenna network node; and said selecting said at least one of said plurality of user equipments, comprises selecting a number of user equipments that is equal to or less than said maximum number of user equipments, for scheduling.

3. The method according to claim 1, wherein said selecting said at least one of said plurality of user equipments comprises determining an achievable throughput for each of said plurality of user equipments, said selecting comprising selecting a user equipment in dependence upon both their achievable throughput, and their determined degree of correlation to said at least one access point channel;

a higher achievable throughput and a lower degree of correlation each increasing a user equipment's chance of being selected.

4. The method according to claim 1, wherein said selecting said at least one of said plurality of user equipments comprises determining an achievable throughput and an average historical throughput for each of said plurality of user equipments, said selecting comprising selecting a user equipment in dependence upon both their ratio of achievable to historical throughput, and their determined degree of correlation to said at least one access point channel;

a higher ratio and a lower degree of correlation each increasing a user equipment's chance of being selected.

5. The method according to claim 1, comprising a further receiving from a user equipment an indication of a strength of a signal received from said multiple antenna network node and a strength of a signal received from said at least one access network node; wherein said selecting said at least one of said plurality of user equipments for scheduling comprising using a relative signal strength of said signal received from said at least one access network node compared to a signal strength received from said multiple antenna network node as a selection parameter, a higher relative signal strength decreasing a chance of said user equipment being selected.

6. The method according to claim 1, wherein a user equipment with a degree of correlation above a predetermined value is not selected for scheduling.

7. The method according to claim 1, comprising following said selecting said at least one of said plurality of user equipments to be scheduled, transmitting to said selected said at least one of said plurality of user equipments by performing precoding operations to form a predetermined number of beams, said predetermined number of beams including beams directed towards said selected said at least one of said plurality of user equipments and at least one null signal beam on which no signal is transmitted corresponding to said at least one access node channel between said at least one access node and said multiple antenna network node.

8. The method according to claim 1, wherein said multiple antenna network node is operable to transmit signals in both a licensed and said unlicensed band.

9. The method according to claim 8, wherein said selecting further comprises selecting user equipments that are not selected for scheduling in said unlicensed band, for scheduling in said licensed band.

10. A non-transitory computer readable medium comprising a computer program, when executed by a processor, is configured to control said processor to perform the method according to claim 1.

11. A multiple antenna network node operable to transmit in an unlicensed band, said multiple antenna network node comprising:

estimating circuitry configured to estimate at least one access node channel within said unlicensed band between at least one access node and said multiple antenna network node, by estimating an aggregated channel value of a plurality of received access node channels and to estimate a plurality of user equipment channels within said unlicensed band between a plurality of user equipments and said multiple antenna network node;

scheduling circuitry configured to determine a degree of channel correlation of each of said plurality of user equipment channels and said at least one access node channel by determining a degree of correlation of each of said plurality of user equipment channels with an aggregated access node channel and to select at least one of said plurality of user equipments to be scheduled in dependence upon an algorithm, said degree of channel correlation being a parameter within said algorithm, a lower degree of channel correlation increasing a user equipment's chance of being selected.

* * * * *